(12) United States Patent
Ali et al.

(10) Patent No.: US 9,298,420 B2
(45) Date of Patent: Mar. 29, 2016

(54) IDENTIFICATION OF THE BIT POSITION OF A SELECTED INSTANCE OF A PARTICULAR BIT VALUE IN A BINARY BIT STRING

(71) Applicant: INTERNATIONAL BUSINESS MACHINES CORPORATION, Armonk, NY (US)

(72) Inventors: Akif A. Ali, Austin, TX (US); Aquilur Rahman, Round Rock, TX (US); Salim A. Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 13/952,057

(22) Filed: Jul. 26, 2013

(65) Prior Publication Data

US 2015/0032786 A1 Jan. 29, 2015

(51) Int. Cl.
*G06F 7/00* (2006.01)
*G06F 7/38* (2006.01)

(52) U.S. Cl.
CPC ........................ *G06F 7/38* (2013.01)

(58) Field of Classification Search
CPC ........................................................ G06F 7/38
USPC ........................................................ 708/210
See application file for complete search history.

(56) References Cited

U.S. PATENT DOCUMENTS

| 4,553,130 | A | 11/1985 | Kato |
| 5,339,447 | A | 8/1994 | Balmer |
| 5,493,520 | A | 2/1996 | Schmookler et al. |
| 6,563,440 | B1 * | 5/2003 | Kangas ................... H03M 7/42 341/65 |
| 2011/0069952 | A1 | 3/2011 | Melange et al. |
| 2012/0219057 | A1 | 8/2012 | Takahashi et al. |

FOREIGN PATENT DOCUMENTS

EP 0393087 A1 10/1990

* cited by examiner

*Primary Examiner* — Tan V. Mai
(74) *Attorney, Agent, or Firm* — Russell Ng PLLC; Steven Bennett

(57) ABSTRACT

A circuit for identifying one or more bit positions of instances of a selected bit value in an N-bit input bit string includes a plurality of adders that compute, in parallel, sums of bits in each of P input substrings comprising the input bit string. A plurality of zero position detectors detect, for each of the P input substrings for which a corresponding sum differs from a threshold sum, one or more bit positions of the selected bit value. Correction logic generates adjustment indications indicative of a number of detected instances of the selected bit value. A plurality of output substring adjusters that, based on the detected bit positions and the adjustment indications, collectively output one or more output vectors identifying a bit position of at least an Mth instance of the selected bit value in the input bit string.

20 Claims, 4 Drawing Sheets

IDENTIFICATION OF THE BIT POSITION OF A SELECTED INSTANCE OF A PARTICULAR BIT VALUE IN A BINARY BIT STRING

BACKGROUND OF THE INVENTION

The present invention relates to data processing, and more specifically, to identifying the bit position of a selected instance of a particular bit value within a binary bit string.

Digital electronic systems have several applications in which it is desirable to identify the bit position of a selected (e.g., first, second, third, etc.) instance of a particular bit value (1 or 0) in a binary bit string. Applications range from cryptography to searching for valid or invalid tagged entries in register files. This computation can be performed in software, but software-based implementations can require execution of multiple instructions over a relatively large number of cycles, and the number of processing cycles required to perform the computation generally increases linearly within the length of the bit string. Consequently, software-based implementations are impractical for many applications requiring low latency.

Hardware-based implementations typically sequentially process the bit string to detect the bit position of a selected instance of the particular bit value. This sequential processing requires sequential examination of the bit value of a current bit position and all bit values in preceding bit positions in the bit string. For an N-bit string, an alternative hardware-based implementation evaluates, in parallel, N substrings of different lengths formed by a unique bit position of the bit string (1, 2, . . . , N) and all bits preceding that bit position in the bit string. As the bit position to be evaluated moves further into the bit string, the cone of logic necessary to process the bits of the corresponding substring in parallel can become quite large. Depending on the length of the bit string to be evaluated and the available integrated circuit die area, a conventional parallel processing implementation may be impractical.

BRIEF SUMMARY

In some embodiments, a circuit for identifying one or more bit positions of instances of a selected bit value in an N-bit input bit string includes a plurality of adders that compute, in parallel, sums of bits in each of P input substrings comprising the input bit string. A plurality of zero position detectors detect the location(s) of first, second, third, etc. zeros, if any, in a corresponding one of the P input substrings. Correction logic generates adjustment indications indicative of a number of instances of the selected bit value detected in the string prior to each substring. Based on the detected bit positions and the adjustment indications, a plurality of output substring adjusters collectively output one or more output vectors identifying a bit position of at least an Mth instance of the selected bit value in the input bit string.

DETAILED DESCRIPTION

The present application discloses a circuit, system, method and design structure for identifying the bit position of a selected (e.g., first, second, third, etc.) instance of a particular bit value (1 or 0) in a binary bit string. The circuit, system and method can be implemented in digital electronic hardware of various kinds, including, without limitation, computer systems, mobile telephones, network infrastructure (e.g., routers, switches, network adapters, etc.), and cryptographic devices. In addition, the techniques disclosed herein may be implemented in emulated or simulated digital electronic devices.

Figure 1:
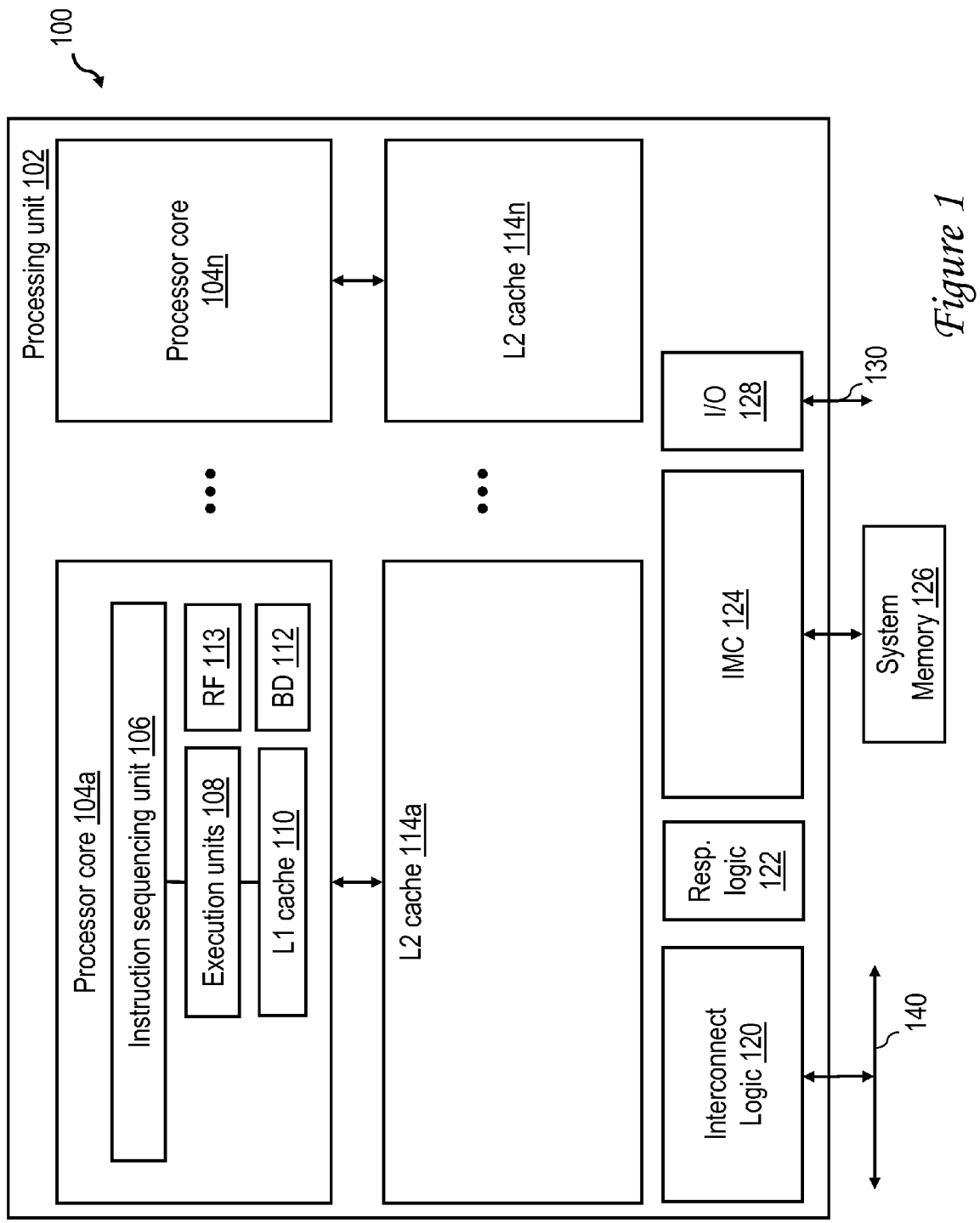
FIG. 1 illustrates a high level block diagram of an exemplary data processing system including a desired bit detector in accordance with one embodiment.

With reference now to the figures and with particular reference to FIG. 1, there is illustrated a high level block diagram of an exemplary data processing system 100 including a bit detector for identifying the bit position of a selected instance of a particular bit value in a binary bit string. As shown, data processing system 100 includes at least one (and in some embodiments numerous) processing units 102. Each processing unit 102 is preferably realized as a single integrated circuit chip having a substrate in which semiconductor circuitry is fabricated as is known in the art. In some embodiments, processing unit 102 (or at least a portion thereof) is implemented in programmable logic, such as a Field Programmable Gate Array (FPGA).

Each processing unit 102 includes multiple processor cores 104a-104n for independently processing instructions and data. Each processor core 104 includes at least an instruction sequencing unit (ISU) 106 for fetching and ordering instructions for execution and one or more execution units 108 for executing instructions. The instructions executed by execution units 108 may include, for example, fixed and floating point arithmetic instructions, logical instructions, and instructions that request read and write access to a memory block in the coherent address space of data processing system 100. During execution, execution units 108 may reference one or more register files 113 to access source operands or to buffer execution results (destination operands).

The operation of each processor core 104a-104n is supported by a multi-level volatile memory hierarchy having at its lowest level one or more shared system memories 126 (only one of which is shown in FIG. 1) and, at its upper levels, one or more levels of cache memory. As depicted, processing unit 102 includes an integrated memory controller (IMC) 124 that controls read and write access to an associated system memory 126 in response to requests received from processor cores 104a-104n and operations received on system fabric 140.

In the illustrative embodiment, the cache memory hierarchy of processing unit 102 includes a store-through level one (L1) cache 110 within each processor core 104a-104n and a store-in level two (L2) cache 114. Although the illustrated cache hierarchy includes only two levels of cache, those skilled in the art will appreciate that alternative embodiments may include additional levels (L3, L4, etc.) of private or shared, on-chip or off-chip, in-line or lookaside cache, which may be fully inclusive, partially inclusive, or non-inclusive of the contents the upper levels of cache.

As further shown in FIG. 1, processing unit 102 includes integrated interconnect logic 120 by which processing unit 102 is coupled to system fabric 140 to which other processing units 102 may be coupled, as well as an instance of response logic 122, which in embodiments employing snoop-based coherency, implements a portion of a distributed coherency messaging mechanism that maintains coherency of the cache hierarchies of processing unit 102. Processing unit 102 further includes one or more integrated I/O (input/output) controllers 128 (e.g., PCI host bridges (PHBs)) supporting I/O communication via one or more communication links 130.

In the depicted embodiment, processing unit 102 additionally includes within each processor core 104 includes a bit detector 112. As described in greater detail below with reference to FIGS. 2-3, bit detector 112 identifies the bit position of a selected (e.g., first, second, third, etc.) instance of a particular bit value (1 or 0) in an input binary bit string. In various implementations, bit detector 112 can be utilized, for example, to decode bit vectors utilized to manage register files 113, to perform pattern matching, to decode serial data, etc. It should be understood that bit detector 112 can alternatively or additionally be implemented in other components of data processing system 100 or other digital electronic systems.

Those skilled in the art will appreciate that data processing system 100 can include many additional or alternative components. Because such additional components are not necessary for an understanding of the present invention, they are not illustrated in FIG. 1 or discussed further herein.

Figure 2:
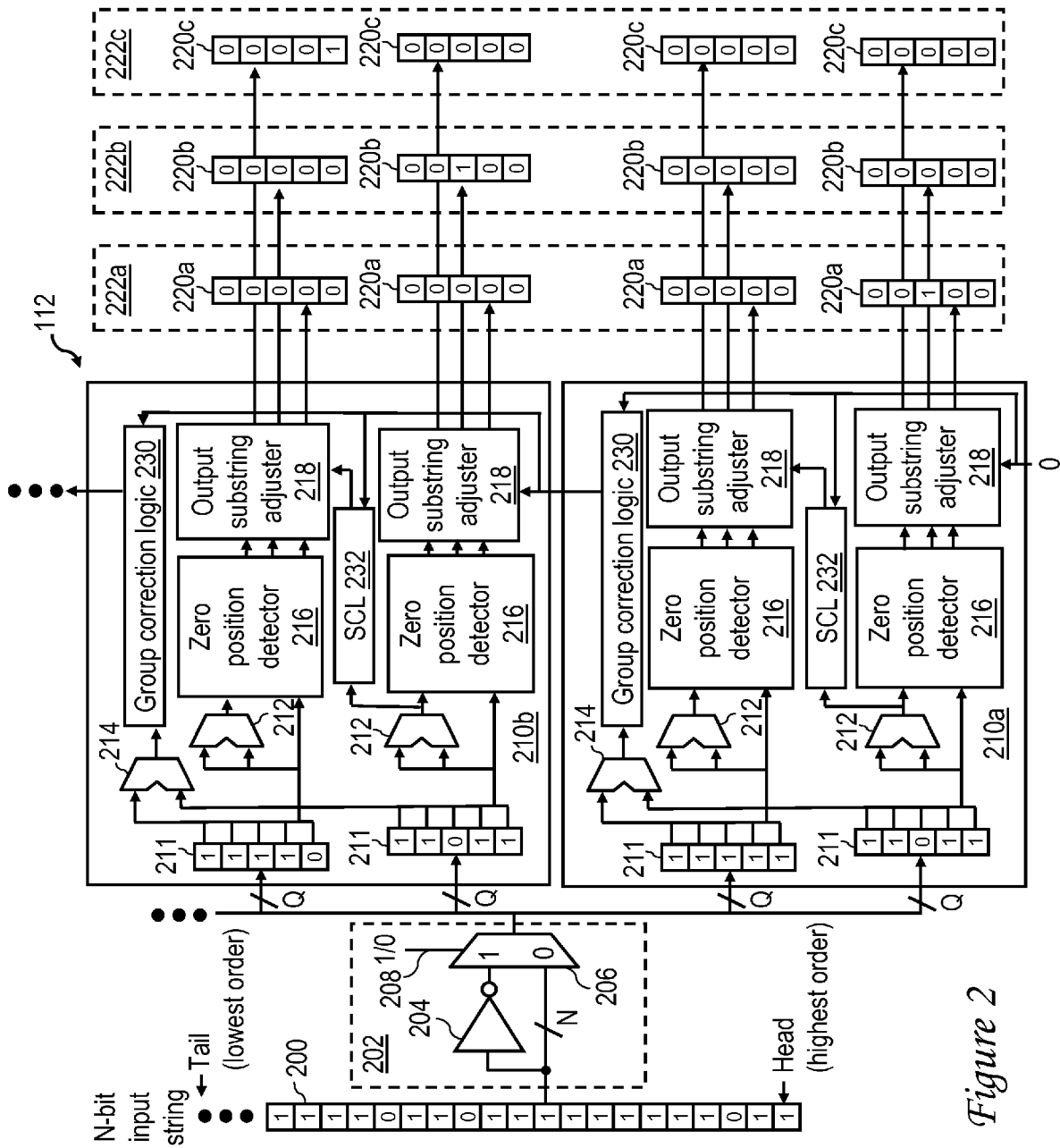
FIG. 2 depicts a more detailed view of an exemplary bit detector in accordance with one embodiment.

Referring now to FIG. 2, there is depicted a more detailed view on an exemplary embodiment of bit detector 112 of FIG. 1. In embodiments that can identify a selected instance of a bit value of either 0 or 1, bit detector 112 includes selection logic 202, including, for example, an inverter 204 and a multiplexer 206. Selection logic 202 receives, as a first input, an N-bit input string 200 formed of N binary bits each having a value of 0 or 1. As indicated, N-bit input string 200 has a tail at which the lowest order bits reside and a head at which the highest order bits reside. Instances of the selected bit value, if any, are counted from the head toward the tail. Selection logic 202 additionally receives, as a second input, a selection signal 208 indicating whether instances of zeros or ones in N-bit input string 200 are to be identified. Inverter 202 inverts N-bit input string 200 to obtain its one's complement, and multiplexer 204 selects between N-bit input string 200 and its one's complement in response to selection signal 208.

Bit detector 112 further includes R (where R<N) instances of group logic 210, which in the illustrated embodiment include at least group logic 210a and 210b. In the depicted embodiment, each instance of group logic 210 receives multiple input substrings 211 of Q bits each, where the concatenation of all the Q-bit input substrings 211 comprises the N-bit string output by multiplexer 204. It should be noted, however, that the number of bits per input substring 211 is not critical and may differ between input substrings 211. Each group logic 210 includes an unary substring adder 212 for each Q-bit input substring 211 and a single unary group adder 214 that sums all of the bits in all the input substrings 211 in that group. The sum generated by each substring adder 212, which is the numerical sum of the Q bits forming the corresponding input substring 211, is received by a respective zero position detector 216, which also receives as an input the Q-bit input substring 211. If the sum generated by the associated substring adder 212 indicates the Q-bit input substring 211 is not formed of all ones (i.e., is less than the maximum possible sum), the zero position detector 216 detects the bit position(s) that have a bit value of 0 and outputs that information in M Q-bit long one-hot encoded intermediate result strings in which a predetermined bit value (e.g., 1) indicates the presence of a zero in the corresponding location in the Q-bit input substring 211, where M represents the maximum depth of detection (i.e., number of instances of a particular bit value) to be detected by bit detector 112. In one exemplary embodiment, zero position detector 216 can be implemented, for example, with a lookup table in which the bit pattern of a Q-bit input substring 211 is conditionally utilized to lookup a corresponding intermediate result string. Zero position detector 216 can alternatively be implemented in NAND, NOR, invert, exclusive or (XOR), and/or exclusive nor (XNOR) gate-based logic, provided the length of Q bits is small and there is sufficient time to establish results. Zero position detector 216 thus determines the first, second, . . . , Mth position(s), if any, of zero within the substring Q.

Each zero position detector 216 is further coupled to provide the M Q-bit intermediate result strings to a respective output substring adjuster 218. Each output substring adjuster 218 generates M one-hot encoded output substrings 220a, 220b, 220c of Q bits each, where M again represents the maximum depth of detection (i.e., number of instances of a particular bit value) to be detected by bit detector 112. Each of the M one-hot encoded output substrings 220 thus indicates the presence or absence of a given instance of the bit value of interest, and the collection of all of a particular set of output substrings 220 forms an N-bit one-hot output vector 222 indicating a bit position, if any, in N-bit input string 200 of a respective instance of the particular bit value to be detected. Thus, for example, the concatenation of all output substrings 220a forms an N-bit one-hot output vector 222a indicating the bit position of the first instance of a particular bit value (e.g., 0 or 1) in N-bit input string 200; the concatenation of all output substrings 220b forms an N-bit one-hot output vector 222b indicating the bit position of the second instance of a particular bit value (e.g., 0 or 1) in N-bit input string 200; and the concatenation of all output substrings 220c forms an N-bit one-hot output vector 222c indicating the bit position of the third instance of a particular bit value (e.g., 0 or 1) in N-bit input string 200. It will be appreciated by those skilled in the art that although in the depicted embodiment M is equal to three, in other embodiments M can be any arbitrary integer that is 2 or greater.

To ensure that each instance of output substring adjuster 218 modifies any detected instances of the bit value of interest in the correct output vector(s) 222, each group logic 210 further includes correction logic configured to provide to output substring adjuster 218 adjustment indications indicating a number of output vectors 222, if any, that the encoded substrings 220 output by the output substring adjusters 218 are to be modified. In the illustrated embodiment, this correction logic includes, in each group logic 210, one instance of group correction logic 230 and an instance of substring correction logic (SCL) 232 per lower order output substring adjuster 218 (i.e., one instance of SCL 232 for each output substring adjuster 218 except for the output substring adjuster 218 that generates the highest order output substrings 220 for that group logic 210). Each SCL 232 has a first input that receives the sum generated by the substring adder(s) 212 of the higher order input substrings 211 in the same group logic 210 and a second input that receives an adjustment amount indicated by the group correction logic 230 of the next higher order group logic 210, if any. SCL 232 then computes a adjustment amount based on sum received at the first input in accordance with Table I below.

TABLE I

| Sum | Adjustment |
|---|---|
| Max_sum (all 1s) | 0 |
| Max_sum − 1 | 1 |
| Max_sum − 2 | 2 |

TABLE I-continued

| Sum | Adjustment |
| --- | --- |
| ... | ... |
| Max_sum − M | M |

SCL 232 increases the adjustment amount determined based on the sum received at its first input by any adjustment amount indicated at the second input by the group correction logic 230 of the next higher order group logic 210. SCL 232 provides the total adjustment amount to the associated output substring adjuster 218.

Group correction logic 230 can be constructed similarly to SCL 232. In particular, group correction logic 230 receives, from the associated unary group adder 214 at a first input, the sum of all bits of the input substrings 211 processed by the group logic 210. Based upon the sum received at the first input, group correction logic 230 generates an adjustment amount in accordance with Table I above. Group correction logic 230 increases the adjustment amount determined based on the sum received at its first input by any adjustment amount indicated at a second input by the group correction logic 230 of the next higher order group logic 210, if any. Group correction logic 230 provides the total adjustment amount to the output substring adjuster 218 that generates the highest order output substrings 220 for the next lower order group logic 210.

In response to a adjustment indication received from a group correction logic 230 or SCL 232, an output substring adjuster 218 outputs all zeros for a number of output substrings 220 equal to the indicated adjustment and encodes any bits of the bit value of interest detected by the associated zero position detector 216 in the remaining output substrings, if any. Thus, for example, if the adjustment indication is 0, then the output substring adjuster 218 simply passes through the M intermediate result strings provided by the feeding zero position detector 216 in order to form portions of output vectors 222a, 222b and 222c, respectively. If however, the adjustment indication is 2, output substring adjuster 218 adjusts the first, second and third positions of 0 as found by zero position detector 216 to the third, fourth and fifth positions, respectively, and indicates the correct position(s) for detected instances, if any, of the bit value of interest in output substrings 220a, 220b and 220c. Thus, for example, if M=3, a given zero position detector 216 detects a single 0 in its input substring and output substring adjuster 218 receives an adjustment value of 2, the output substring adjuster 218 outputs all zeros (0b0) for its output substrings 220a and 220b, and indicates the position of the detected 0 in output substring 220c.

Figure 3:
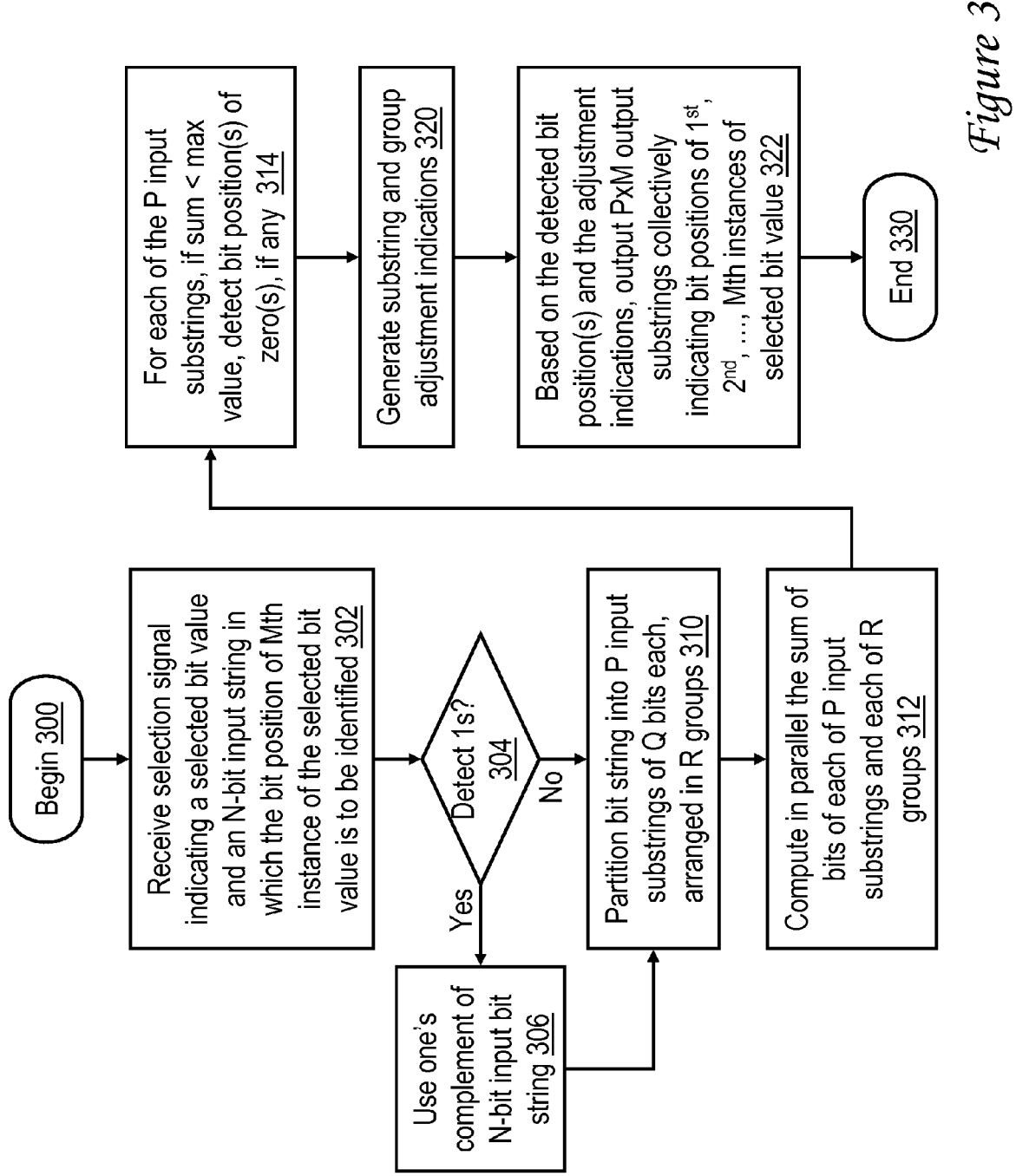
FIG. 3 is a high level logical flowchart of an exemplary method of identifying the bit position of a selected instance of a particular bit value in a binary bit string.

With reference now to FIG. 3, there is illustrated a high level logical flowchart of an exemplary method of identifying the bit position of a selected instance of a particular bit value in an input binary bit string. For ease of understanding, the process of FIG. 3 is described with reference to the embodiment of a bit detector 112 given FIG. 2 and to the exemplary bit string given therein.

The process of FIG. 3 begins at block 300 and proceeds to block 302, which depicts a bit detector 112 receiving, as inputs, a selection signal 208 indicating a selected bit value (e.g., 1 or 0) of interest and an N-bit input string 200 in which the bit position of the Mth instance of the selected bit value is to be identified. In the depicted example, input string 200 is a binary bit string of at least 20 bits having zeros at bit positions 3, 13 and 16, and in which the bit positions of the first three zeros are to be identified. As indicated at block 304, in response to selection signal 208 indicating the bit value of 1 is to be detected, selection logic 202 of bit detector 112 outputs the one's complement of N-bit input string 200. Alternatively, if selection signal 208 indicates the bit value of 0 is to be detected (as is the case with the illustrated example), selection logic 202 outputs N-bit input string 200 itself.

At block 310, the string output by selection logic 202 (i.e., N-bit input string 200 or its one's complement) is partitioned input P input substrings 211 of Q bits each, where the P input substrings 211 are organized in R groups. Thus, in the illustrated example, the 20-bit input string 200 is partitioned into four input substrings 211 of five bits each, with the input substrings 211 being organized into two groups. At block 312, bit detector 112 computes, in parallel, the sum of the bits in each of the P input substrings 211 using unary substring adders 212 and the sum of the bits in each of the R groups using unary group adders 214. As will be appreciated, a sum equal to the maximum possible sum for each input substring 211 or group indicates the absence of a zero in the input substring 211 or group, and any lesser sum indicates the aggregate number of zeros in the corresponding input substring 211 or group. In the given example, each of the first, third and fourth substring adders 212 generates a sum of 4, indicating the presence of a single zero in the corresponding input substrings 211. Further, group adder 214 of group logic 210a generates a sum of 9, indicating the presence of a single zero in the group, and group adder 214 of group logic 210b generates a sum of 8, indicate the presence of two zeros in that group.

Each of zero position detectors 216 then detects the bit position(s) of zeros, in any, in the associated input substrings 211 if the sum generated by the associated substring adder 212 is less than the maximum value (which is indicative of a substring of all ones) (block 314). As indicated above, each of zero position detectors 216 indicates the bit position(s), if any, of detected zeros in M Q-bit one-hot encoded intermediate result strings in which a predetermined bit value (e.g., 1) indicates the presence of a zero in the corresponding location in the Q-bit input substring 211. Thus, in the given example, the first zero position detector 216 outputs intermediate result strings of "00100," "00000" and "00000" in response to detection of the first instance of zero, the second zero position detector 216 outputs three intermediate result strings of "00000" in response to not detecting a zero, the third zero position detector 216 outputs intermediate result strings of "00100," "00000" and "00000" in response to detection of the second instance of zero, and the fourth zero position detector 216 outputs intermediate result strings of "10000," "00000" and "00000" in response to detection of the third instance of zero.

In parallel with detecting the bit position(s) of zeros, if any, at block 314, bit detector 112 generates adjustment indications using correction logic, including SCL 232 and group correction logic 230 (block 320). For example, in group logic 210a, SCL 232 and group correction logic 230 both generate an adjustment indication of one in response to the presence of a zero at the third bit position. In group logic 210b, SCL 232 generates an adjustment indication of two in response to the presence of zeros at the third and thirteenth bit positions, and group correction logic 230 generates an adjustment indication of three in response to the presence of zeros at the third, thirteenth, and sixteenth bit positions.

Based on the bit positions detected at block 314 and the adjustment indications generated at block 320, bit detector 112 outputs P×M output substrings 220 collectively forming M output vectors 222 respectively indicating the bit positions of the first through Mth instances of the selected bit value (block 322). Thus, in the illustrated example, the first instance of a zero in input string 200 is indicated by a one at the third bit position of output vector 222a, the second instance of a zero in input string 200 is indicated by a one at the thirteenth bit position of output vector 222b, and the third instance of a zero in input string 200 is indicated by a one at the sixteenth bit position of output vector 222c. Following block 322, the process of FIG. 3 thereafter ends at block 330.

It should be noted that the disclosed circuit and method employ significant parallelism. For example, unary adders 212 and 214 all generate sums in parallel, and zero position detectors 216, SCL 232 and group correction logic 230 all operate in parallel. As a result, in typical implementations, bit detector 112 can receive an input bit string 200 and generate the corresponding output vectors 222 within a single clock cycle. It should also be noted that the disclosed technique of bit value detection is direction-independent (i.e., the head and the tail of the input string can be arbitrarily assigned) and the detection can alternatively be performed relative to the tail end of the input string.

Figure 4:
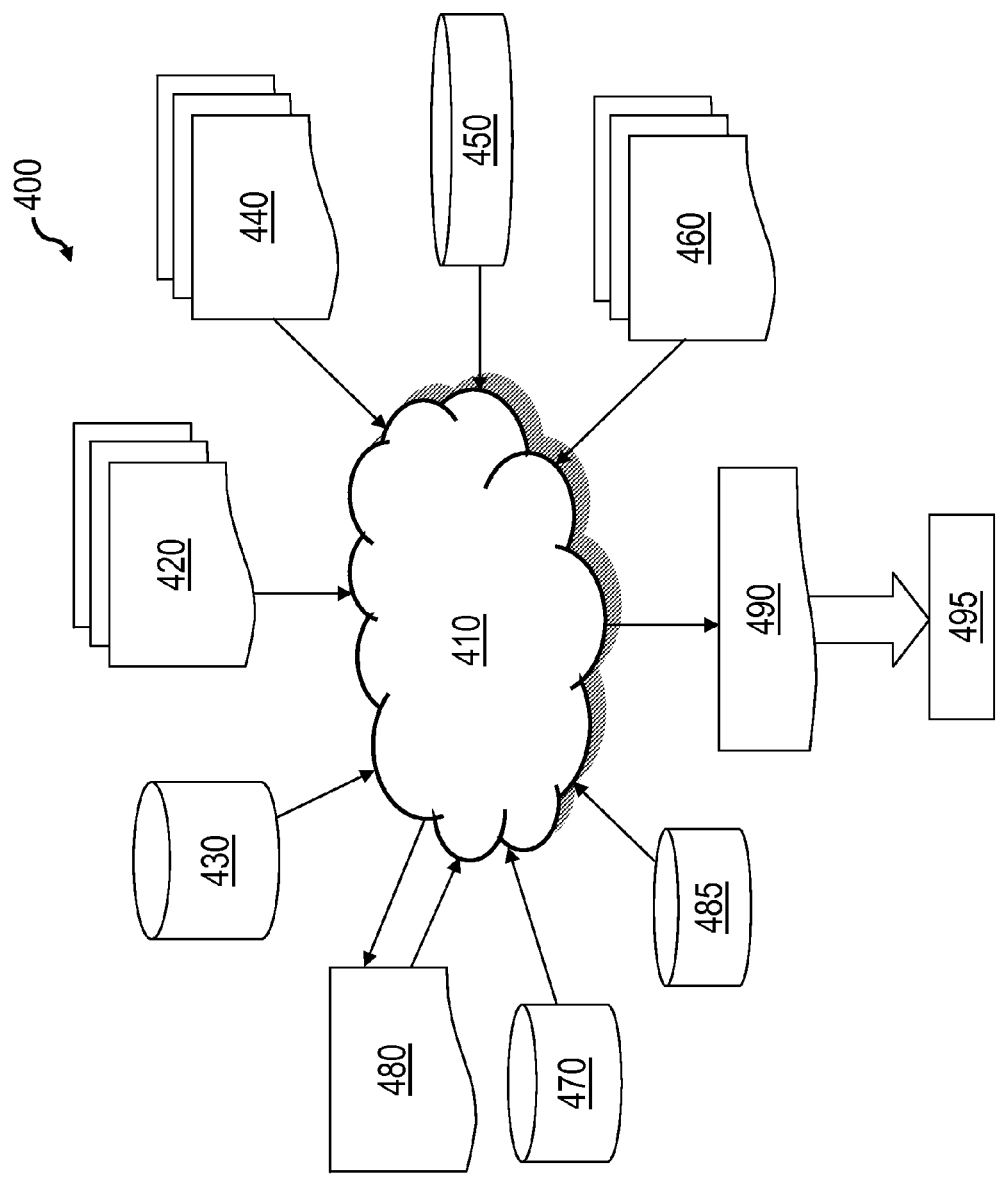
FIG. 4 depicts an exemplary design process.

Referring now to FIG. 4, there is depicted a block diagram of an exemplary design flow 400 used for example, in semiconductor IC logic design, simulation, test, layout, and manufacture. Design flow 400 includes processes, machines and/or mechanisms for processing design structures or devices to generate logically or otherwise functionally equivalent representations of the design structures and/or devices described above and shown in FIGS. 1-2. The design structures processed and/or generated by design flow 400 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 400 may vary depending on the type of representation being designed. For example, a design flow 400 for building an application specific IC (ASIC) may differ from a design flow 400 for designing a standard component or from a design flow 400 for instantiating the design into a programmable array, for example a programmable gate array (PGA) or a field programmable gate array (FPGA) offered by Altera® Inc. or Xilinx® Inc.

FIG. 4 illustrates multiple such design structures including an input design structure 420 that is preferably processed by a design process 410. Design structure 420 may be a logical simulation design structure generated and processed by design process 410 to produce a logically equivalent functional representation of a hardware device. Design structure 420 may also or alternatively comprise data and/or program instructions that when processed by design process 410, generate a functional representation of the physical structure of a hardware device. Whether representing functional and/or structural design features, design structure 420 may be generated using electronic computer-aided design (ECAD) such as implemented by a core developer/designer. When encoded on a machine-readable data transmission, gate array, or storage medium, design structure 420 may be accessed and processed by one or more hardware and/or software modules within design process 410 to simulate or otherwise functionally represent an electronic component, circuit, electronic or logic module, apparatus, device, or system such as those shown in FIGS. 1-2. As such, design structure 420 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog® and VHDL, and/or higher level design languages such as C or C++.

Design process 410 preferably employs and incorporates hardware and/or software modules for synthesizing, translating, or otherwise processing a design/simulation functional equivalent of the components, circuits, devices, or logic structures shown in FIGS. 1-2 to generate a netlist 480 which may contain design structures such as design structure 420. Netlist 480 may comprise, for example, compiled or otherwise processed data structures representing a list of wires, discrete components, logic gates, control circuits, I/O devices, models, etc. that describes the connections to other elements and circuits in an integrated circuit design. Netlist 480 may be synthesized using an iterative process in which netlist 480 is resynthesized one or more times depending on design specifications and parameters for the device. As with other design structure types described herein, netlist 480 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 410 may include hardware and software modules for processing a variety of input data structure types including netlist 480. Such data structure types may reside, for example, within library elements 430 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 440, characterization data 450, verification data 460, design rules 470, and test data files 485 which may include input test patterns, output test results, and other testing information. Design process 410 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 410 without deviating from the scope and spirit of the invention. Design process 410 may also include modules for performing standard circuit design processes such as timing analysis, verification, design rule checking, place and route operations, etc.

Design process 410 employs and incorporates logic and physical design tools such as HDL compilers and simulation model build tools to process design structure 420 together with some or all of the depicted supporting data structures along with any additional mechanical design or data (if applicable), to generate a second design structure 490. Design structure 490 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 420, design structure 490 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-2. In one embodiment, design structure 490 may comprise a compiled, executable HDL simulation model that functionally simulates the devices shown in FIGS. 1-2.

Design structure 490 may also employ a data format used for the exchange of layout data of integrated circuits and/or symbolic data format (e.g., information stored in a GDSII (GDS2), GL1, OASIS, map files, or any other suitable format for storing such design data structures). Design structure 490 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-2. Design structure 490 may then proceed to a stage 495 where, for example, design structure 490: proceeds to tape-out, is released to manufacturing, is released to a mask house, is sent to another design house, is sent back to the customer, etc.

As has been described, a circuit for identifying one or more bit positions of instances of a selected bit value in an N-bit input bit string includes a plurality of adders that compute, in parallel, sums of bits in each of P input substrings comprising the input bit string. A plurality of zero position detectors each detect the position of desired bit value within the span of bits Q. Correction logic generates adjustment indications indicative of a number of detected instances of the selected bit value. A plurality of output substring adjusters that, based on the detected bit positions and the adjustment indications, collectively output one or more output vectors identifying a bit position of at least an Mth instance of the selected bit value in the input bit string.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a computer-readable storage device (e.g., volatile or non-volatile memory, optical or magnetic disk or other statutory manufacture) that stores program code that can be processed by a data processing system. Further, the term "coupled" as used herein is defined to encompass embodiments employing a direct electrical connection between coupled elements or blocks, as well as embodiments employing an indirect electrical connection between coupled elements or blocks achieved using one or more intervening elements or blocks. In addition, the term "exemplary" is defined herein as meaning one example of a feature, not necessarily the best or preferred example.

What is claimed is:

1. A method in a circuit for identifying one or more bit positions of instances of a selected bit value in an input bit string, the method comprising:
   a plurality of adders computing, in parallel, sums of bits in each of the P input substrings of an N-bit input bit string;
   for each of the P input substrings for which the sum differs from a threshold sum, detecting, by a plurality of zero position detectors, one or more bit positions of the selected bit value;
   generating, utilizing correction logic, adjustment indications indicative of a number of detected instances of the selected bit value; and
   based on the detected bit positions and the adjustment indications, outputting, by a plurality of output substring adjusters, one or more output vectors identifying a bit position of at least an Mth instance of the selected bit value in the input bit string.

2. The method of claim 1, wherein the computing includes computing each of the sums utilizing a respective one of P unary adders.

3. The method of claim 1, wherein:
   M is an integer greater than one; and
   the outputting includes outputting at least M one-hot encoded output vectors respectively indicating bit positions of first through Mth instances of the selected bit value.

4. The method of claim 1, and further comprising performing the computing, detecting, generating and outputting steps within one clock cycle.

5. The method of claim 1, wherein the detecting and generating are performed in parallel.

6. The method of claim 1, wherein the generating includes generating P−1 adjustment indications.

7. The method of claim 1, wherein:
   the threshold sum is a maximum sum; and
   the detecting includes:
      for each of the P input substrings for which the sum is less than the maximum sum, detecting one or more bit positions of the selected bit value.

8. The method of claim 1, wherein at least two of the P input substrings include different numbers of bits.

9. A circuit for identifying one or more bit positions of instances of a selected bit value in an N-bit input bit string including P input substrings, the circuit comprising:
   a plurality of adders that compute, in parallel, sums of bits in each of the P input substrings;
   a plurality of zero position detectors that, for each of the P input substrings for which a corresponding sum differs from a threshold sum, detecting one or more bit positions of the selected bit value;
   correction logic that generates adjustment indications indicative of a number of detected instances of the selected bit value; and
   a plurality of output substring adjusters that, based on the detected bit positions and the adjustment indications, collectively output one or more output vectors identifying a bit position of at least an Mth instance of the selected bit value in the input bit string.

10. The circuit of claim 9, wherein the plurality of adders comprises P unary adders.

11. The circuit of claim 9, wherein:
   M is an integer greater than one; and
   the plurality of output substring adjusters includes P output substring adjusters; and the P output substring adjusters collectively output at least M one-hot encoded output vectors respectively indicating bit positions of first through Mth instances of the selected bit value.

12. The circuit of claim 9, wherein the circuit receives the N-bit input string and outputs the one or more output vectors within one clock cycle.

13. The circuit of claim 9, wherein the zero position detectors and correction logic operate in parallel.

14. The circuit of claim 9, wherein the correction logic generates P−1 adjustment indications.

15. The circuit of claim 9, wherein:
the threshold sum is a maximum sum; and
the plurality of zero position detectors detect one or more bit positions of the selected bit value for each of the P input substrings for which a corresponding sum is less than the maximum sum.

16. The circuit of claim 9, wherein at least two of the P input substrings include different numbers of bits.

17. A processing unit, comprising:
the circuit in accordance with claim 9;
a processing core including the circuit; and
a cache memory coupled to the processor core.

18. A data processing system, comprising: a processing unit in accordance with claim 17;
a system fabric coupled to the processing; and
a system memory coupled to the processing unit.

19. A design structure tangibly embodied in a machine-readable storage device for designing, manufacturing, or testing an integrated circuit, the design structure comprising:
a circuit for identifying one or more bit positions of instances of a selected bit value in an N-bit input bit string including P input substrings, the circuit comprising:
a plurality of adders that compute, in parallel, sums of bits in each of the P input substrings;
a plurality of zero position detectors that, for each of the P input substrings for which a corresponding sum differs from a threshold sum, detecting one or more bit positions of the selected bit value;
correction logic that generates adjustment indications indicative of a number of detected instances of the selected bit value; and
a plurality of output substring adjusters that, based on the detected bit positions and the adjustment indications, collectively output one or more output vectors identifying a bit position of at least an Mth instance of the selected bit value in the input bit string.

20. The design structure of claim 19, wherein the design structure comprises a hardware description language (HDL) design structure.

* * * * *